Figure 1:
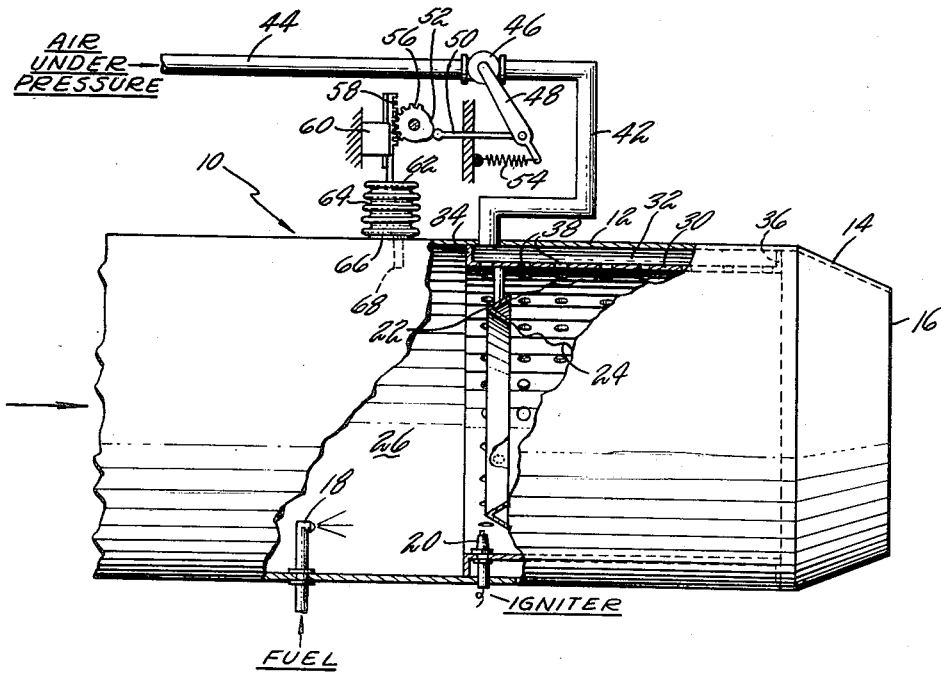

June 21, 1960

A. W. BLACKMAN 2,941,356

VARIABLE PRESSURE WAVE ABSORPTION FOR COMBUSTION CHAMBERS

Filed March 1, 1957

INVENTOR
ARTHUR W. BLACKMAN JR.
BY *Leonard F. Weklind*
ATTORNEY

United States Patent Office 2,941,356
Patented June 21, 1960

2,941,356

VARIABLE PRESSURE WAVE ABSORPTION FOR COMBUSTION CHAMBERS

Arthur W. Blackman, Newington, Conn., assignor to United Aircraft Corporation, East Hartford, Conn., a corporation of Delaware Filed Mar. 1, 1957, Ser. No. 643,351

7 Claims. (Cl. 60—39.23)

This invention relates to high output power plants but more specifically to high output combustion chambers having absorption liners to control high frequency oscillatory combustion known as screech.

It is an object of this invention to provide a combustion chamber with an absorption liner which has a variable absorption coefficient.

It is a further object of this invention to provide a variable absorption liner for high output combustion chambers.

It is a still further object of this invention to provide a combustion chamber with a perforated absorption liner having a regulator which responds to the pressure level in the combustion chamber to control the air flow in the space behind the liner and through the perforations thereof in such a manner so as to compensate for variations in the absorption of the liner with variations in pressure level.

Figure 2:
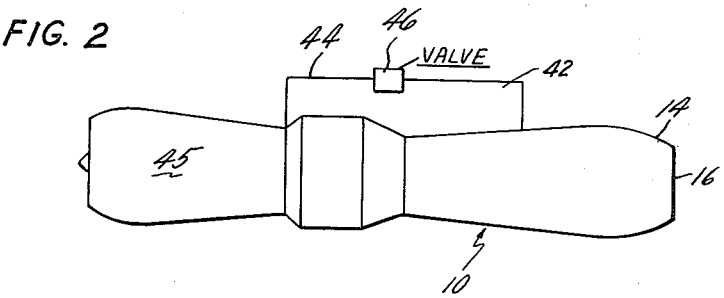

These and other objects of this invention will become readily apparent from the following detailed description of the drawing in which:

Fig. 1 is a schematic illustration in partial cross section of a combustion chamber having an absorption liner according to this invention; and Fig. 2 is a schematic illustration of a turbojet power plant illustrating the use of compressor pressure as a source of fluid for the absorptive liner.

High frequency oscillatory combustion known as screech has been experienced in many high output combustors, such as those used with rockets, ramjets, and turbojet afterburners. When this type of combustion is encountered, it usually causes failure of the combustion chamber structural components within a matter of seconds. It has been shown that these screech oscillations can be controlled or eliminated by providing proper resonator type absorption liners within the combustion chamber. These liners are usually perforated with an open area, for example, ranging or varying between 2 percent and 10 percent of the total area of the liner.

However, for a given percentage of open area, the liner will have a relatively fixed coefficient of absorption defined as the percentage of the incident acoustical energy absorbed. With high output power plants and with variations in operating altitude, the pressure level in the combustion chamber will vary considerably. It can be shown that the absorption coefficient of the liner varies with combustion chamber pressure level. Hence, an absorption liner designed to have sufficient absorption to eliminate screech at one combustion chamber pressure level may be inadequate at another pressure level. It is therefore desirable to have an absorption liner whose coefficient will be invariant with combustion chamber pressure.

Referring to Fig. 1, a combustion chamber is generally indicated at 10 and the combustion chamber can be one utilized in an afterburner for a turbojet power plant, a ramjet, a rocket, or any other similar type of power plant. The combustion chamber 10 has an outer casing 12 which terminates its aft end in an exhaust nozzle 14, and an exhaust opening 16. Fuel under pressure may be injected by one or more nozzles 18 and ignited by a suitable igniter mechanism such as schematically shown at 20. An annular V-type flameholder 22 may be provided adjacent the point of ignition so as to establish a suitable flame front indicated at 24. The casing 12 of the combustion chamber 10 defines a combustion chamber passage 26.

In order to provide high frequency absorption in the combustion chamber, a perforated sleeve 30 is located in the passage 26 and has its walls spaced inwardly from the casing 12 thereby defining an annular chamber or space 32 between the casing 12 and the liner 30. The sleeve 30 includes an upstream closure wall 34 and a downstream closure wall 36 so as to close off the space 32 at the upstream and downstream ends, respectively, of the sleeve 30.

The sleeve 30 includes a plurality of perforations 38 through which fluid is passed from the space 32 into the combustion chamber passage 26 to provide absorption of the high frequency pressure oscillations of combustion. It can be shown that by varying the flow through the perforations 38, the coefficient of absorption of the liner 30 can be varied. By controlling the air flow through the perforations 38 of the liner 30 in a prescribed manner, the effects of variations in combustion chamber pressure on the absorption coefficient can be compensated for. Hence the absorption coefficient of the liner can be made invariant with combustion chamber pressure level or altitude.

In order to vary the flow through the perforations 38, the space 30 has connected thereto a pipe 42. The pipe 42 may be supplied with fluid under pressure from the pipe 44 from any suitable source. As shown in Fig. 2, this source may be from a compressor 45 of a turbojet power plant. Referring again to Fig. 1, a valve 46 is located in a connection between the pipe 44 and the pipe 42. The valve 46 may be opened or closed in different increments by a suitable control arm 48. The control arm 48 carries intermediate its ends a cam follower 50 which engages a suitably contoured cam 52. A spring 54 urges the control arm 48 to the left, thereby insuring that the cam follower 50 remains in engagement with the cam 52. The cam 52 includes a portion of a pinion gear 56 thereon which gear is operated by a suitable rack 58. The rack 58 is supported by a guide 60 for reciprocal movement relative thereto. The rack 58 is connected to a movable wall 62 of a bellows 64 which is fixed at 66 to the outer casing 12 of the combustion chamber. The bellows 64 by means of a vent 68 is connected to the inside of the combustion chamber passage 26.

Thus with variations in combustion chamber pressure, the bellows 64 will expand or contract thereby moving the bellows wall 62 and the rack 58 to thereby rotate the cam 52. This in turn varies the opening of the valve 46 to vary the flow to the pipe 42 and the space 32 back of the liner 30. This in turn varies the flow through the perforations 38 to vary the absorption coefficient of the absorption liner 30.

The maximum absorption coefficient, $\alpha$ max (which is a measure of effectiveness of this type liner), can be written:

$$\alpha \max = \frac{4\theta}{(\theta+1)^2}$$

where $\theta$ is the face resistance of the liner.

The value of $\theta$ can be written as $$\theta_i \frac{(1+\Sigma+\Delta)}{\sqrt{P}}$$

where $\Sigma$ is a factor dependent upon the amplitude of the pressure waves being absorbed and $\Delta$ is a factor dependent upon the steady state flow of air through the liner face.

From these equations it can be seen that the optimum value of absorption occurs when $\theta$ is numerically equal to 1.0. Hence, $\theta$ can be kept at the optimum value if the value of Δ is controlled by varying the steady state air flow through the liner to compensate for changes in the pressure P. Thus, in general, as the pressure level in the burner is decreased, the steady state air flow through the liner should decrease and vice versa.

The cam 52 is contoured in such a manner as to provide the relation given in the equation below between the flow through the valve 46 and the pressure applied to the bellows 66 through vent 68

$$W = \sqrt{PK_1 - K_2}$$

where W is the flow rate passed through valve 46, P is the pressure applied to the bellows 66 and $K_1$ and $K_2$ are empirically determined constants which depend on the design of the perforated sleeve 30 and annular chamber 32. In general an increase in the pressure applied through vent 68 will cause valve 46 to open and increase the flow through pipe 42.

As a result of this invention, it is apparent that a very simple but effective control means has been provided to vary the absorption coefficient of perforated combustion chamber liners so that effective absorption and screech elimination is provided over a range of altitude conditions.

Although only one embodiment of this invention has been illustrated and described herein, it will be apparent that various changes and modifications may be made in the construction and arrangement of the various parts without departing from the scope of this novel concept.

What it is desired by Letters Patent is:

1. In combination, a combustion chamber having an outer wall defining a passage having a longitudinal axis, a perforated liner inside said passage spaced inwardly from said outer wall, a wall running transversely of said axis between the upstream end of said liner and said outer wall, said walls and liner forming a space therebetween, a source of fluid under pressure externally of said combustion chamber, means for conducting fluid under pressure from said source in the space between said walls and said liner, means for regulating the fluid flow to said space, and means responsive to the pressure level in said passage for controlling said regulating means to vary the flow in a direction proportional to pressure changes.

2. In a combustion chamber having an outer wall forming a duct, a sleeve in said duct spaced inwardly from said wall forming a secondary chamber therebetween, means between said wall and sleeve forming an upstream closure for said secondary chamber, a plurality of openings in said sleeve, a source of fluid under pressure, means for conducting fluid from said source into said secondary chamber for flow through said openings into the combustion chamber to vary the absorption coefficient of said sleeve, means for regulating the flow of fluid from said source to said secondary chamber, means for controlling said regulating means including a pressure responsive device, and means connecting said pressure responsive device to said combustion chamber to sense the pressure level therein, whereby fluid flow to said secondary chamber is increased with an increase in pressure in said combustion chamber and vice versa.

3. In a combustion chamber having an outer wall forming a duct, a sleeve in said duct spaced inwardly from said wall forming a secondary chamber therebetween, said sleeve and chamber having an axis common to the axis of said combustion chamber, an imperforate wall running transversely of said axis between the upstream end of said sleeve and said outer wall forming a closure for said chamber, a plurality of openings in said sleeve, a source of fluid under pressure, means for conducting fluid from said source into said secondary chamber for flow through said openings into the combustion chamber to vary the absorption coefficient of said sleeve, means for regulating the flow of fluid from said source to said secondary chamber, and pressure responsive means for controlling said regulating means including a pressure responsive device operatively connected to said combustion chamber whereby the fluid flow to said secondary chamber is varied as a function of the pressure in said combustion chamber to obtain a desired absorption coefficient.

4. In a combustion chamber having an outer wall forming a duct, a sleeve in said duct spaced inwardly from said wall forming a secondary chamber therebetween, means between said wall and sleeve forming an upstream closure for said secondary chamber, a plurality of openings in said sleeve, a source of fluid under pressure, means for conducting fluid from said source into said secondary chamber for flow through said openings into the combustion chamber to vary the absorption coefficient of said sleeve, means for regulating the flow of fluid from said source to said secondary chamber, means for controlling said regulating means including a pressure responsive device, means connecting said pressure responsive device to said combustion chamber to sense the pressure level therein, and means connecting said pressure responsive device to said regulating means for varying the effect of said device on said regulating means, whereby said fluid flow to said secondary chamber is increased with an increase in pressure in said combustion chamber and vice versa.

5. In a combustion chamber having an outer wall forming a duct portion, a sleeve in said duct spaced inwardly from said wall forming a secondary chamber therebetween, means spanning the space between said wall and sleeve forming an upstream closure for said secondary chamber, a plurality of openings in said sleeve, a source of fluid under pressure outside said duct portion, means for conducting fluid from said source into said secondary chamber for flow through said openings into the combustion chamber to vary the absorption coefficient of said sleeve, means for regulating the flow of fluid from said source to said secondary chamber, means for controlling said regulating means including a pressure responsive device, means connecting said pressure responsive device to said combustion chamber to sense the pressure level therein, and cam means connecting said pressure responsive device to said regulating means, said cam means giving a desired program of absorption coefficient.

6. In a power plant having a compressor, a combustion chamber receiving air from said compressor, said combustion chamber having an outer wall forming a duct, a sleeve in said duct spaced inwardly from said wall forming a secondary chamber therebetween, means between said wall and sleeve forming an upstream closure for said secondary chamber, a plurality of openings in said sleeve, means for conducting fluid from said compressor into said secondary chamber for flow through said openings into the combustion chamber to vary the absorption coefficient of said sleeve, means for regulating the flow of fluid from said compressor to said secondary chamber, means for controlling said regulating means including a pressure responsive device, and means connecting said pressure responsive device to said combustion chamber to sense the pressure level therein, whereby the absorption coefficient is varied in a predetermined relationship with respect to the combustion chamber pressure.

7. In a power plant according to claim 6 including an annular flameholder adjacent the upstream end of said sleeve.

References Cited in the file of this patent

UNITED STATES PATENTS

| | | |
|---|---|---|
| 1,733,792 | Good | Oct. 29, 1929 |
| 2,107,365 | Bray | Feb. 8, 1938 |
| 2,621,477 | Powter et al. | Dec. 16, 1952 |
| 2,655,787 | Brown | Oct. 20, 1953 |
| 2,807,933 | Martin | Oct. 1, 1957 |